United States Patent
Zhao et al.

(10) Patent No.: US 12,455,835 B2
(45) Date of Patent: Oct. 28, 2025

(54) METHODS, APPARATUSES, AND ELECTRONIC DEVICES FOR EVICTING MEMORY BLOCK IN CACHE

(71) Applicant: Beijing OceanBase Technology Co., Ltd., Beijing (CN)

(72) Inventors: Yuzhong Zhao, Zhejiang (CN); Runchen Hu, Zhejiang (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 33 days.

(21) Appl. No.: 18/501,844

(22) Filed: Nov. 3, 2023

(65) Prior Publication Data
US 2024/0061789 A1    Feb. 22, 2024

Related U.S. Application Data

(63) Continuation of application No. PCT/CN2022/090269, filed on Apr. 29, 2022.

(30) Foreign Application Priority Data

May 6, 2021 (CN) .......................... 202110490282.8

(51) Int. Cl.
*G06F 12/12* (2016.01)
*G06F 12/126* (2016.01)

(52) U.S. Cl.
CPC .................................. *G06F 12/126* (2013.01)

(58) Field of Classification Search
CPC ............... G06F 12/126; G06F 12/0868; G06F 2212/1016; G06F 2212/214;
(Continued)

(56) References Cited

U.S. PATENT DOCUMENTS

| 11,249,652 B1* | 2/2022 | Kuzmin ................. G06F 3/061 |
| 2011/0093654 A1 | 4/2011 | Roberts et al. |

(Continued)

FOREIGN PATENT DOCUMENTS

| CN | 102272739 | 12/2011 |
| CN | 103167036 | 6/2013 |

(Continued)

OTHER PUBLICATIONS

International Preliminary Report on Patentability in Appln. No. PCT/CN2022/090269, mailed on Nov. 16, 2023, 12 pages (with English translation).

(Continued)

*Primary Examiner* — Masud K Khan
(74) *Attorney, Agent, or Firm* — Fish & Richardson P.C.

(57) ABSTRACT

Implementations of the present specification describe evicting a memory block in a cache, including determining a temperature index value of a memory block in a cache, where the memory block is a storage unit of the cache. Based on the temperature index value of the memory block in the cache, determining a to-be-evicted memory block that needs to be cleared in the cache. A target element in the to-be-evicted memory block is migrated to a target memory block in the cache, where the target memory block is a memory block that is retained in the cache and whose available storage space is greater than storage space required by the target element. The to-be-evicted memory block is deleted from the cache.

20 Claims, 4 Drawing Sheets

(58) Field of Classification Search
CPC ............ G06F 2212/313; G06F 12/122; G06F 3/0608; G06F 3/061; G06F 3/064; G06F 3/0647; G06F 3/0683
See application file for complete search history.

(56) References Cited

U.S. PATENT DOCUMENTS

| | | | |
|---|---|---|---|
| 2012/0317338 | A1 | 12/2012 | Yi et al. |
| 2013/0191601 | A1* | 7/2013 | Peterson ............ G06F 12/0868 711/E12.017 |
| 2016/0054917 | A1 | 2/2016 | Lee |
| 2016/0196207 | A1 | 7/2016 | Gupta et al. |
| 2017/0060764 | A1 | 3/2017 | Shetty et al. |
| 2017/0285971 | A1 | 10/2017 | Dai et al. |
| 2018/0210675 | A1 | 7/2018 | Tang et al. |
| 2020/0379809 | A1* | 12/2020 | Yudanov ................ G06F 12/08 |
| 2021/0019650 | A1 | 1/2021 | Hsu et al. |
| 2021/0089233 | A1 | 3/2021 | Ueda et al. |

FOREIGN PATENT DOCUMENTS

| | | |
|---|---|---|
| CN | 106227598 | 12/2016 |
| CN | 107122124 | 9/2017 |
| CN | 107305475 | 10/2017 |
| CN | 107391392 | 11/2017 |
| CN | 108628758 | 10/2018 |
| CN | 108920096 | 11/2018 |
| CN | 109491619 | 3/2019 |
| CN | 109783402 | 5/2019 |
| CN | 109815005 | 5/2019 |
| CN | 109947787 | 6/2019 |
| CN | 109960662 | 7/2019 |
| CN | 110427158 | 11/2019 |
| CN | 110442309 | 11/2019 |
| CN | 110674056 | 1/2020 |
| CN | 110858124 | 3/2020 |
| CN | 111309650 | 6/2020 |
| CN | 111324303 | 6/2020 |
| CN | 111858405 | 10/2020 |
| CN | 112905129 | 6/2021 |
| CN | 113805805 | 12/2021 |
| CN | 117093508 | 11/2023 |
| CN | 117235088 | 12/2023 |
| EP | 2787433 | 10/2014 |
| WO | WO 2022/233272 | 11/2022 |

OTHER PUBLICATIONS

International Search Report and Written Opinion in Appln. No. PCT/CN2022/090269, mailed on Jun. 30, 2022, 15 pages (with English translation).

Sagahyroon et al., "impact of cache optimization techniques on energy management," Canadian Conference on Electrical and Computer Engineering, May 2, 2004, p. 1831-1833 (abstract only).

Wei et al., "SSD garbage collection strategy for caching," Sep. 30, 2015, The 19th Annual Conference on Computer Engineering and Technology and the 5th Microprocessor Technology Forum, p. 385-389 (abstract only, with English machine transltaed abstract).

Extended European Search Report in European Appln. No. 22798613.0, mailed on Aug. 8, 2024, 9 pages.

Oh et al., "Per-Operation Reusability Based Allocation and Migration Policy for Hybrid Cache," IEEE Transactions on Computers, Sep. 27, 2019, 69(2):158-71.

* cited by examiner

METHODS, APPARATUSES, AND ELECTRONIC DEVICES FOR EVICTING MEMORY BLOCK IN CACHE

CROSS-REFERENCE TO RELATED APPLICATIONS

This application is a continuation of PCT Application No. PCT/CN2022/090269, filed on Apr. 29, 2022, which claims priority to Chinese Patent Application No. 202110490282.8, filed on May 6, 2021, and each application is hereby incorporated by reference in its entirety.

TECHNICAL FIELD

This document pertains to the field of data storage technologies, and in particular, relates to methods, apparatuses, and electronic devices for evicting a memory block in a cache.

BACKGROUND

Currently, all storage systems release cache space based on a specific policy. For example, value of a memory block in a cache is evaluated based on an access temperature (the memory block is a storage unit of the cache), so a lower-value memory block can be cleared. However, in many storage systems, a memory block does not merely store one element (the element is cache data). Therefore, there is a possibility that a small part of elements in one memory block is frequently accessed, and the other part of the elements are rarely accessed. Consequently, the memory block has a cold temperature on the whole, and is finally evicted by the storage system. Clearly, performance and gain of the cache are reduced if a frequently accessed element is cleared from the cache.

In view of this, a solution is urgently needed currently, to avoid evicting an element with a high access frequency when the storage system evicts a memory block.

SUMMARY

Embodiments of this specification aim to provide methods, apparatuses and electronic devices for evicting a memory block in a cache, so that when the memory block in the cache is to be evicted, a valuable element in a memory block that needs to be evicted is migrated to another memory block, to avoid affecting performance and gain of the cache.

To achieve the above-mentioned objective, the embodiments of this specification are implemented as follows: According to a first aspect, a method for evicting a memory block in a cache is provided, including: determining a temperature index value of the memory block in the cache, where the memory block is a storage unit of the cache; determining, based on the temperature index value of the memory block in the cache, a to-be-evicted memory block that needs to be cleared in the cache; migrating a target element in the to-be-evicted memory block to a target memory block in the cache, where the target memory block is a memory block that is retained in the cache and whose available storage space is greater than storage space needed by the target element; and deleting the to-be-evicted memory block from the cache.

According to a second aspect, a method for evicting a memory block in a cache is provided, applied to a storage system of a log structured merge (LSM) tree storage architecture, and including: determining a temperature index value of a memory block (MemBlock) in a memory table (MemTable) of an LSM tree of the storage system, where the MemTable is configured to store cache data of the storage system; determining, based on the temperature index value of the MemBlock in the MemTable, a to-be-evicted MemBlock that needs to be cleared in the MemTable; migrating a target element in the to-be-evicted MemBlock to a target MemBlock in the MemTable, where the target MemBlock is a MemBlock that is retained in the MemTable and whose available storage space is greater than storage space needed by the target element; and deleting the to-be-evicted MemBlock from the MemTable.

According to a third aspect, an apparatus for evicting a memory block in a cache is provided, including: a temperature determining module, configured to determine a temperature index value of the memory block in the cache, where the memory block is a storage unit of the cache; an eviction analysis module, configured to determine, based on the temperature index value of the memory block in the cache, a to-be-evicted memory block that needs to be cleared in the cache; an element migration module, configured to migrate a target element in the to-be-evicted memory block to a target memory block in the cache, where the target memory block is a memory block that is retained in the cache and whose available storage space is greater than storage space needed by the target element; and an eviction execution module, configured to delete the to-be-evicted memory block from the cache.

According to a fourth aspect, an electronic device is provided, including a storage, a processor, and a computer program that is stored in the storage and that can run on the processor, where the computer program is executed by the processor, to implement the following steps: determining a temperature index value of a memory block in a cache, where the memory block is a storage unit of the cache; determining, based on the temperature index value of the memory block in the cache, a to-be-evicted memory block that needs to be cleared in the cache; migrating a target element in the to-be-evicted memory block to a target memory block in the cache, where the target memory block is a memory block that is retained in the cache and whose available storage space is greater than storage space needed by the target element; and deleting the to-be-evicted memory block from the cache.

According to a fifth aspect, a computer-readable storage medium is provided. A computer program is stored in the computer-readable storage medium, and when the computer program is executed by a processor, the following steps are implemented: determining a temperature index value of a memory block in a cache, where the memory block is a storage unit of the cache; determining, based on the temperature index value of the memory block in the cache, a to-be-evicted memory block that needs to be cleared in the cache; migrating a target element in the to-be-evicted memory block to a target memory block in the cache, where the target memory block is a memory block that is retained in the cache and whose available storage space is greater than storage space needed by the target element; and deleting the to-be-evicted memory block from the cache.

In the solutions in the embodiments of this specification, the temperature index value of the memory block in the cache can be updated, and when cache space needs to be cleared, the to-be-evicted memory block that needs to be cleared is determined based on the updated temperature index value of the memory block. Before clearing, a valuable element in the to-be-evicted memory block is migrated to another memory block, to avoid a case in which a high-value element in the cache is lost due to clearing of the memory block, and consequently, performance and gain are reduced.

BRIEF DESCRIPTION OF DRAWINGS

To describe the technical solutions in embodiments of this specification or in an existing technology more clearly, the following briefly describes the accompanying drawings needed for describing the embodiments or the existing technology. Clearly, the accompanying drawings in the following descriptions merely show some embodiments recorded in the embodiments of this specification, and a person of ordinary skill in the art can still derive other drawings from these accompanying drawings without creative efforts.

DESCRIPTION OF EMBODIMENTS

To make a person skilled in the art better understand the technical solutions in this specification, the following clearly and comprehensively describes the technical solutions in the embodiments of this specification with reference to the accompanying drawings in the embodiments of this specification. Clearly, the described embodiments are merely some but not all of the embodiments of this specification. All other embodiments obtained by a person of ordinary skill in the art based on the embodiments of this specification without creative efforts shall fall within the protection scope of this specification.

As described above, currently, all storage systems release cache space based on a specific policy. Here, a storage unit of a cache is referred to as a memory block. Usually, value of the memory block is evaluated based on an access temperature of the memory block, and a low-value memory block is evicted when cache space needs to be released. However, in many storage systems, a memory block does not merely store one element (the element is cache data). Therefore, there is a possibility that a small part of elements in one memory block is frequently accessed, and the other part of the elements is rarely accessed. Consequently, the memory block has a cold temperature on the whole, and is finally evicted by the storage system. Clearly, performance and gain of the cache are reduced if a frequently accessed element is cleared from the cache.

In view of this, this specification aims to provide a solution for evicting a memory block in a cache, so that when the memory block in the cache is to be evicted, a valuable element in a memory block that needs to be evicted is migrated to another memory block, to avoid affecting performance and gain of the cache.

Figure 1:
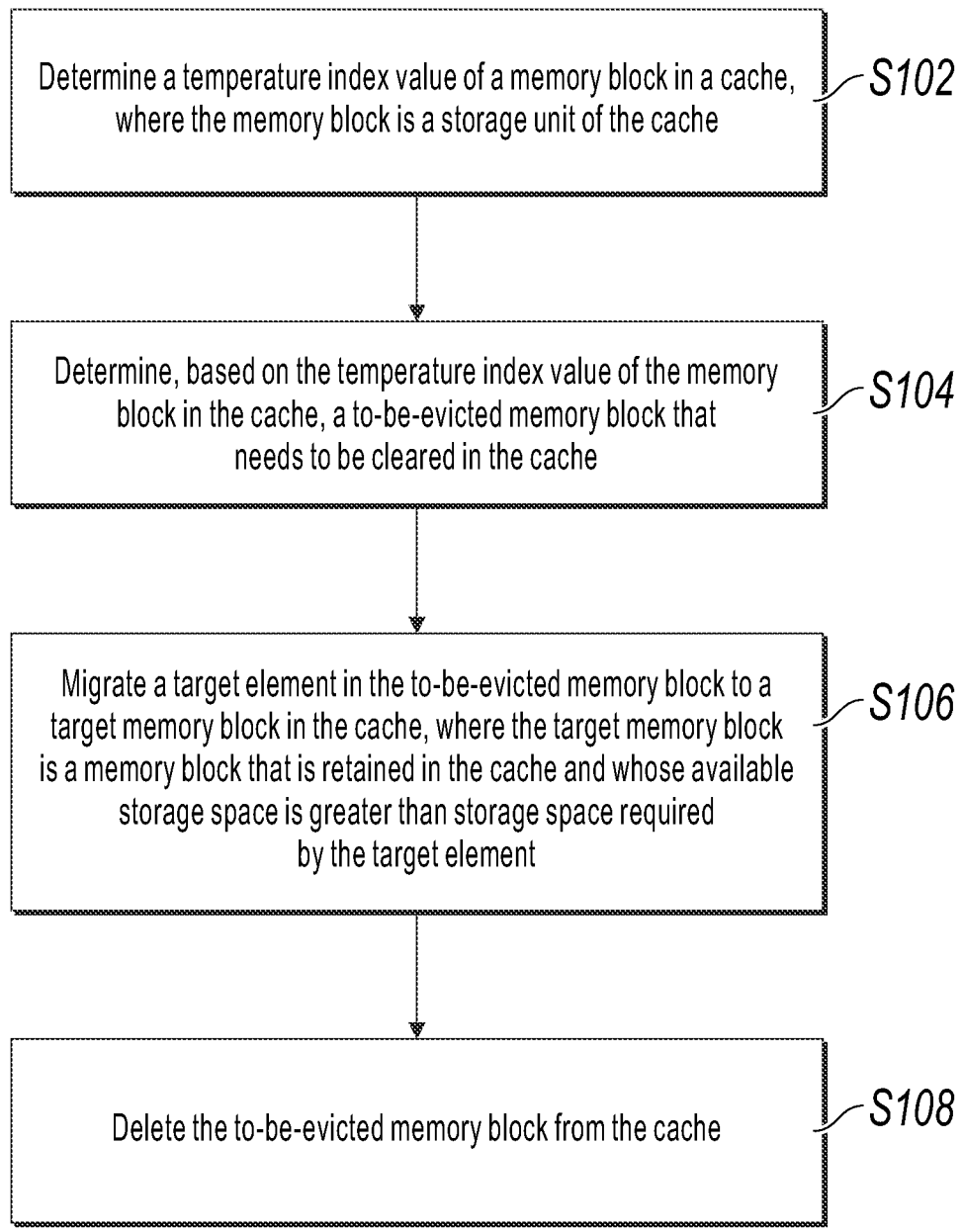
FIG. 1 is a schematic flowchart illustrating a method for evicting a memory block in a cache, according to one or more embodiments of this specification.

FIG. 1 is a flowchart illustrating a method for evicting a memory block in a cache, according to one or more embodiments of this specification. The method shown in FIG. 1 can be performed by the following corresponding hardware. The method includes the following steps. S102: Determine a temperature index value of a memory block in a cache, where the memory block is a storage unit of the cache.

It should be understood that a method of calculating the temperature index value of the memory block is not unique, and is not specifically limited in this specification.

For example, the temperature index value of the memory block in the one or more embodiments of this specification can be determined based on a quantity of access times of an element in the memory block.

For example, the element is used as a granularity. A temperature index value of the element is calculated based on the quantity of access times corresponding to the element and an element weight coefficient (the element weight coefficient can reflect importance of the element), and then the temperature index value of the memory block is calculated based on a temperature index value of each element in the memory block.

In addition, timeliness of a temperature can be further introduced based on the above. For example, the temperature index value of the element is calculated based on the quantity of access times corresponding to the element, a previous-period temperature index value, a temperature temporal attenuation coefficient, and the element weight coefficient, and then the temperature index value of the memory block is calculated based on the temperature index value of each element in the memory block. Clearly, when a current-period temperature index value of the element is calculated based on the previous-period temperature index value of the element and the temperature temporal attenuation coefficient, it can be ensured that a temperature of the element does not lose impact in a short period of time. However, the impact is weakened over time. This reflects timeliness of the temperature to a certain extent.

S104: Determine, based on the temperature index value of the memory block in the cache, a to-be-evicted memory block that needs to be cleared in the cache.

Specifically, in the method in the one or more embodiments of the specification, a to-be-evicted memory block to be cleared can be determined when the cache has clearing needs. For example, the to-be-evicted memory block can start to be selected when occupation of storage space of the cache reaches an occupation upper limit, when a quantity of memory blocks in the cache reaches a quantity upper limit, and when a memory block that is not accessed for predetermined time exists in the cache.

It should be understood that, in this step, a relatively lower-value memory block is selected as a to-be-evicted memory block. In other words, a temperature index value of the to-be-evicted memory block is lower than that of another memory block that needs to be retained in the cache.

For example, a predetermined quantity of memory blocks can be selected, in ascending order of temperature index values, as a target memory block that needs to be cleared; or a memory block whose temperature index value does not reach a memory block temperature threshold in the cache can be determined as a target memory block that needs to be cleared. Because a policy of selecting the to-be-evicted memory block is not unique, examples of details are omitted here.

S106: Migrate a target element in the to-be-evicted memory block to a target memory block in the cache, where the target memory block is a memory block that is retained in the cache and whose available storage space is greater than storage space needed by the target element.

It should be understood that the memory block retained in the cache is another memory block other than the to-beevicted memory block in the cache. The memory block retained in this step may be retained or evicted when a memory block is to be evicted next time.

In actual applications, in the one or more embodiments of this specification, the target element in the to-be-evicted memory block can be flexibly selected based on occupation of space of the cache. That is, the target element in the to-be-evicted memory block is not unique, and can be all elements in the to-be-evicted memory block, or can be some elements whose temperature index values reach an element temperature threshold (an element whose temperature index value reaches the element temperature threshold can be considered as an element that satisfies a value need) in the to-be-evicted memory block.

For example, if a memory block that can store all the elements in the to-be-evicted memory block is retained in the cache, the target element is all the elements in the to-be-evicted memory block. In other words, when there is a capability of migrating all the elements in the to-be-evicted memory block, all the elements in the to-be-evicted memory block can be migrated, to clear the to-be-evicted memory block when it is ensured that all elements in the cache are not lost.

Certainly, if no memory block that can store all the elements in the to-be-evicted memory block is retained in the cache, the target element is the element whose temperature index value reaches the element temperature threshold in the to-be-evicted memory block. In other words, the element worth migrating in the to-be-evicted memory block is selected as the target element based on the element temperature threshold.

In a migration process, if the target element in the to-be-evicted memory block is previously selected based on the element temperature threshold, but still no another memory block that can store the target element is retained in the cache, migration can be implemented in the following method:

An element in another memory block retained in the cache is deleted, to clear storage space used to store the target element, and the another memory block whose storage space is cleared is determined as the target memory block. A temperature index value of the deleted element in the another memory block is less than the temperature index value of the target element.

For ease of understanding, it is assumed here that a memory block 1 is a to-be-evicted memory block, and the memory block 1 has three high-value elements: an element A, an element B, and an element C. Before the memory block 1 is evicted, the element A, the element B, and the element C in the memory block 1 need to be migrated. Here, assuming that all other memory blocks that do not need to be evicted have no space for storing the element A, the element B, and the element C, the memory blocks that do not need to be evicted in the cache need to be traversed, to identify a target memory block that stores at least three elements whose temperature index values are lower than those of the element A, the element B, and the element C, and the three elements whose temperature index values in the target memory block are lower than those of the element A, the element B, and the element C are cleared, to spare space for storing the three high-value elements A, B, and C in the memory block 1.

Certainly, in addition to the above-mentioned method, a plurality of target memory blocks can be selected. Here, each target memory block stores at least another element whose temperature index value is lower than those of the elements A, B, and C, and three elements whose temperature index values are lower than those of the elements A, B, and C are cleared from the plurality of target memory blocks, to spare space for storing the high-value elements A, B, and C in the memory block 1. For example, memory blocks 2, 3, and 4 that do not need to be evicted in the cache are selected as target memory blocks, and one element whose temperature index value is lower than those of the elements A, B, and C is selected from each of the memory blocks 2, 3, and 4 for clearing, so that the memory block 2 stores the element A in the memory block 1, the memory block 3 stores the element B in the memory block 1, and the memory block 4 stores the element C in the memory block 1.

Clearly, based on the above-mentioned design, if all memory blocks that do not need to be evicted in the cache have no space for storing the target element that needs to be migrated in the to-be-evicted memory block, an element can be selected based on a temperature index value, to ensure a maximum gain of the cache.

S108: Delete the to-be-evicted memory block from the cache.

In the method in the one or more embodiments of this specification, the temperature index value of the memory block in the cache can be updated, and when space of the cache needs to be cleared, the to-be-evicted memory block that needs to be cleared can be determined based on the updated temperature index value of the memory block. Before clearing, a valuable element in the to-be-evicted memory block is migrated to another memory block, to avoid a case in which a high-value element in the cache is lost due to clearing of the memory block, and consequently, performance and gain are reduced.

The following describes the method in the one or more embodiments of this specification in detail with reference to an actual application scenario.

Figure 2:
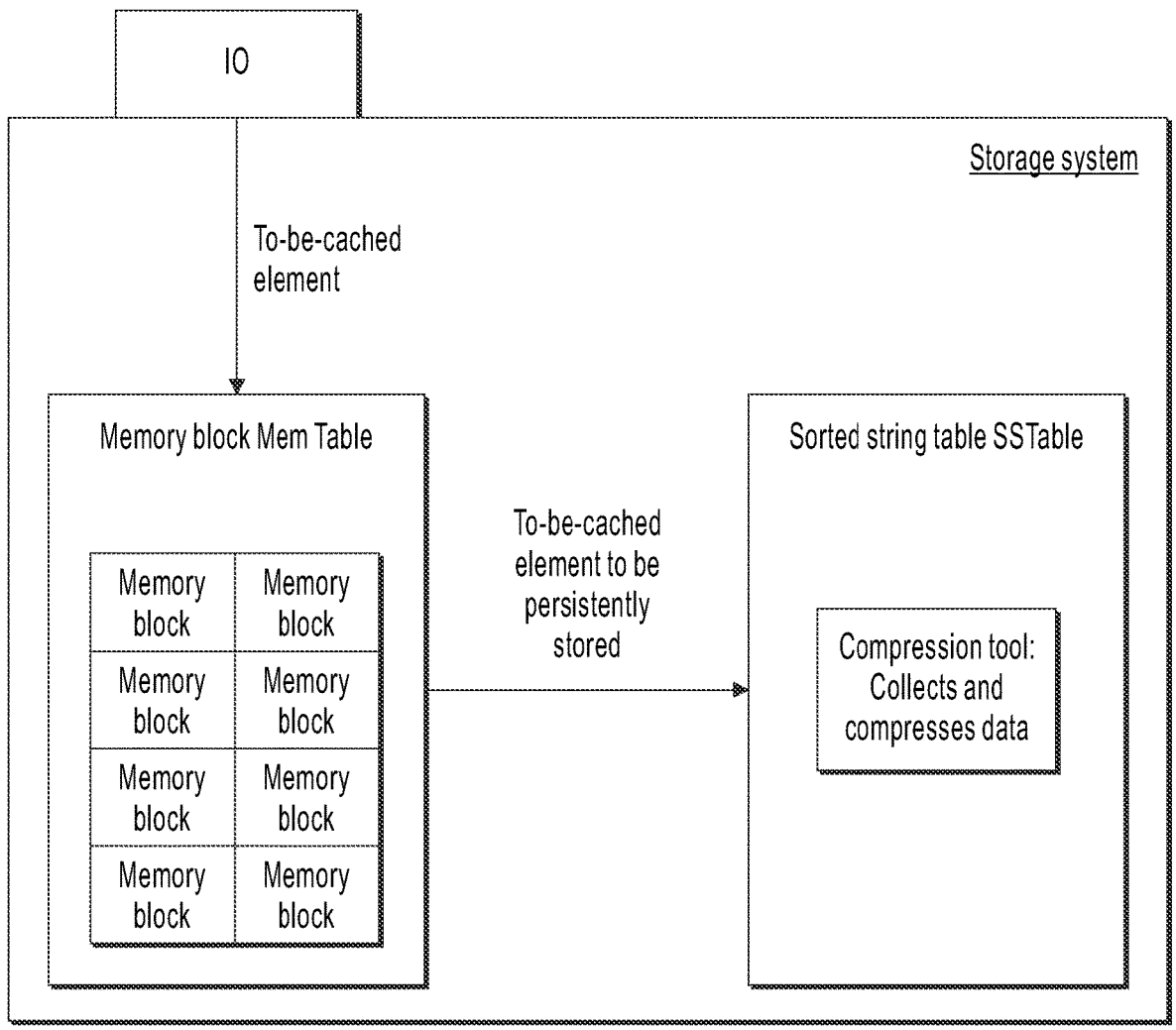
FIG. 2 is a schematic structural diagram illustrating a storage system, according to one or more embodiments of this specification.

As shown in FIG. 2, this application scenario provides a storage system of an LSM tree architecture, including a memory table (MemTable) storage structure and a sorted string table (SSTable) storage structure. A MemTable is configured to store cache data of the storage system. All data in the storage system is updated in a memory table (MemTable). The background persistently stores, in the SSTable through dump, a cache element in the MemTable. A compression tool (compactor) in the SSTable is responsible for collecting and compressing data.

To help the compactor perform data compression and clearing, and to facilitate management of a plurality of types of caches, the cache element in the MemTable needs to have a variable length in the storage system in this application scenario. To manage the cache element with a variable length, a memory block (MemBlock) with a fixed length is set in the MemTable as a minimum storage unit. Although there are many different types of cache elements with a variable length in the storage system, a unified cache framework is designed. Different types of caches of different tenants are managed by the framework together, and different types of cache elements are distinguished based on different priorities.

Further, the storage system calculates a score of an access temperature of each element in the MemBlock, and a more frequently accessed element has a higher score. In addition, for each MemBlock, a total score is determined based on scores of all elements in the MemBlock.

In the one or more embodiments of this specification, a cache is evicted in a unit of a MemBlock that is a minimum unit of managing memory. A cache clearing thread in the background of the storage system periodically calculates scores of all the elements in the MemTable and scores of all the MemBlocks, sorts all the current MemBlocks based on the scores, and evicts a MemBlock with a low score.

In specific applications, a user writes data (a to-be-cached element) through M.

The storage system allocates a memory to the to-be-cached element: Because the to-be-cached element has a variable length, an actual needed memory size is first calculated. If the to-be-cached element can be accommodated by a current MemBlock, the to-be-cached element is allocated to the current MemBlock; or if the to-be-cached element cannot be accommodated by a current MemBlock, a new MemBlock is allocated for storage.

In a process of allocating the new MemBlock, if the MemTable does not have enough memory or a quantity of MemBlocks reaches an upper limit, a MemBlock eviction process is executed: All MemBlocks in the cache are traversed, and a score of a temperature of the current MemBlock is updated. A range of a MemBlock that needs to be evicted in a current cache eviction process is calculated based on information about a specified upper/lower limit of the MemBlock. All the MemBlocks in the cache are traversed, the score of the temperature of the MemBlock is sorted, and a MemBlock with a lowest temperature is selected for eviction.

In the eviction process, the background of the storage system adjusts an element with a high temperature in the to-be-evicted MemBlock to another MemBlock that has a high temperature and that does not need to be evicted, to improve a hit rate of the cache, thereby reflecting higher performance and a higher gain.

It can be seen from the above-mentioned content that, to facilitate management of a plurality of types of caches, in the storage system in this application scenario, the cache element with a variable length is designed, and the MemBlock with a fixed length is used for storage, to implement cache clearing at a granularity of MemBlock. In addition, the storage system calculates a score of a temperature of each cache element. When a certain MemBlock is evicted, a cache element with a high temperature score can be migrated to another MemBlock, to avoid losing an element with a high temperature when space of the cache is cleared.

The above-mentioned application scenario is an example description of the method in the embodiments of this invention. It should be understood that the storage system in the application scenario can perform steps in the eviction method shown in FIG. 1, including: determining, based on the temperature index value of the MemBlock in the MemTable, a to-be-evicted MemBlock that needs to be cleared in the MemTable; migrating a target element in the to-be-evicted MemBlock to a target MemBlock in the MemTable, where the target MemBlock is a MemBlock that is retained in the MemTable and whose available storage space is greater than storage space needed by the target element; and deleting the to-be-evicted MemBlock from the MemTable.

Figure 3:
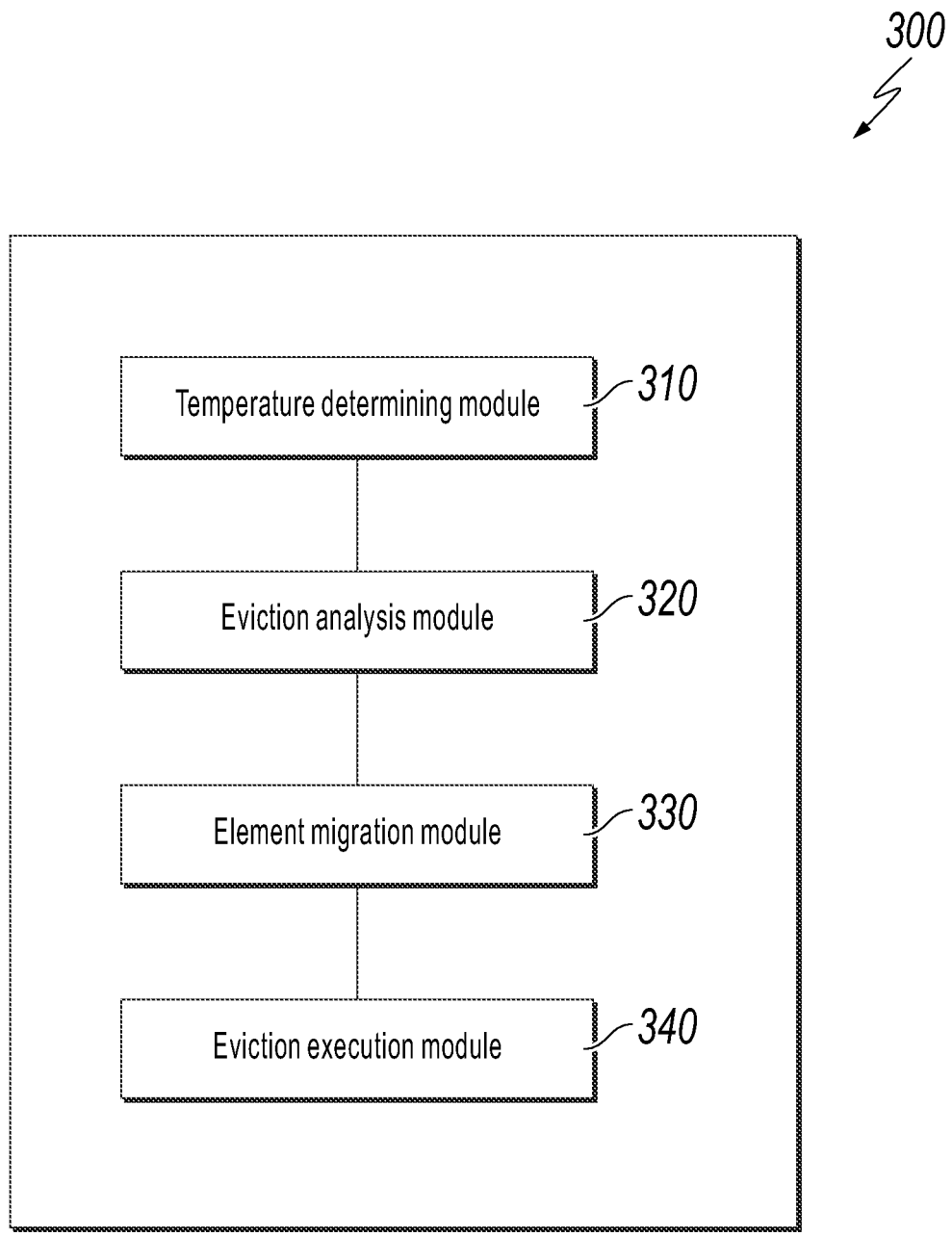
FIG. 3 is a schematic structural diagram illustrating an apparatus for evicting a memory block in a cache, according to one or more embodiments of this specification.

In addition, corresponding to the method for evicting a memory block in a cache shown in FIG. 1, one or more embodiments of this invention further provide an apparatus for evicting a memory block in a cache. FIG. 3 is a schematic structural diagram illustrating an eviction apparatus 300, according to one or more embodiments of this invention. The eviction apparatus 300 includes: a temperature determining module 310, configured to determine a temperature index value of a memory block in a cache, where the memory block is a storage unit of the cache; an eviction analysis module 320, configured to determine, based on the temperature index value of the memory block in the cache, a to-be-evicted memory block that needs to be cleared in the cache; an element migration module 330, configured to migrate a target element in the to-be-evicted memory block to a target memory block in the cache, where the target memory block is a memory block that is retained in the cache and whose available storage space is greater than storage space needed by the target element; and an eviction execution module 340, configured to delete the to-be-evicted memory block from the cache.

The apparatus in the one or more embodiments of this specification can update the temperature index value of the memory block in the cache, and when space of the cache needs to be cleared, determine the to-be-evicted memory block that needs to be cleared based on the updated temperature index value of the memory block. Before clearing, a valuable element in the to-be-evicted memory block is migrated to another memory block, to avoid a case in which a high-value element is lost in the cache due to clearing of the memory block, and consequently, performance and gain are reduced.

Optionally, the target element is all elements in the to-be-evicted memory block, or the target element is an element whose temperature index value reaches an element temperature threshold in the to-be-evicted memory block.

If a memory block that can store all the elements in the to-be-evicted memory block is retained in the cache, the target element is all the elements in the to-be-evicted memory block. In other words, when there is a capability of migrating all the elements in the to-be-evicted memory block, all the elements in the to-be-evicted memory block can be migrated, to clear the to-be-evicted memory block when it is ensured that no element is lost.

If no memory block that can store all the elements in the to-be-evicted memory block is retained in the cache, the target element is the element whose temperature index value reaches the element temperature threshold in the to-be-evicted memory block. In other words, the element worth migrating in the to-be-evicted memory block is selected as the target element based on the element temperature threshold.

Optionally, before migrating the target element in the to-be-evicted memory block to the target memory block in the cache, the element migration module 330 is further configured to select, from the cache as the target memory block, another memory block that is retained and that can store the target element. If no another memory block that can store the target element is retained in the cache, the element migration module 330 can delete an element in another memory block retained in the cache, to clear storage space used to store the target element, and determine, as the target memory block, the another memory block whose storage space is cleared. A temperature index value of the deleted element in the another memory block is less than a temperature index value of the target element.

Based on a deletion method of the element migration module 330, if all memory blocks that do not need to be evicted in the cache have no space for storing the target element that needs to be migrated in the to-be-evicted memory block, an element can be selected based on a temperature index value. If an element whose temperature index value is lower than that of the target element exists in the memory block that does not need to be evicted, the element can be deleted, to spare storage space for the target element.

Optionally, an execution condition in which the eviction analysis module 320 determines, based on the temperature index value of the memory block in the cache, a target memory block that needs to be cleared in the cache includes at least one of the following: occupation of storage space of the cache reaches an occupation upper limit; a quantity of memory blocks in the cache reaches a quantity upper limit; and a memory block that is not accessed for predetermined time exists in the cache.

Optionally, a temperature index value of an element in the memory block is calculated based on a quantity of access times corresponding to the element, a previous-period temperature index value, and a temperature temporal attenuation coefficient. The temperature index value of the memory block is determined based on temperature index values of all elements in the memory block.

Optionally, the eviction analysis module 320 can select, in ascending order of temperature index values, a predetermined quantity of memory blocks as the target memory block that needs to be cleared; or can determine that a memory block whose temperature index value does not reach a memory block temperature threshold in the cache is the target memory block that needs to be cleared.

Optionally, the cache is a MemTable of an LSM tree, the MemTable is an element in cache with a variable length, and space occupied by data of the element is not greater than storage space provided by the memory block.

Clearly, the eviction apparatus in the one or more embodiments of this specification can be used as an execution body of the eviction method shown in FIG. 1, so that a function implemented in the eviction method in FIG. 1 can be implemented. Because principles are the same, details are omitted in this specification.

Figure 4:
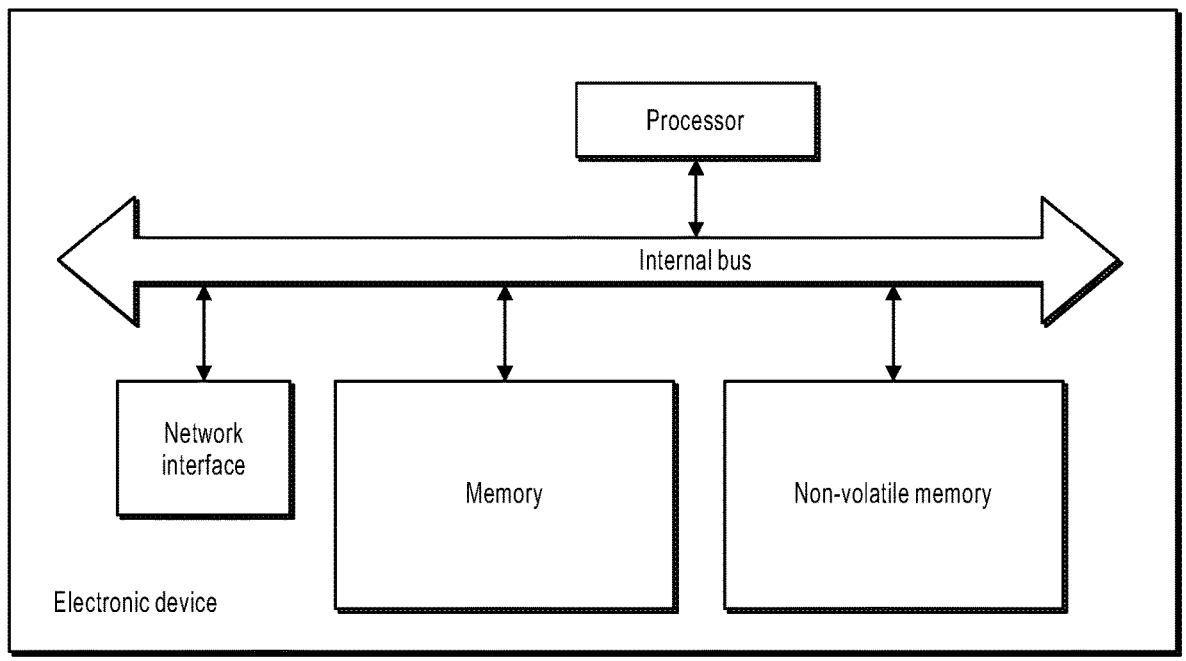
FIG. 4 is a schematic structural diagram illustrating an electronic device, according to one or more embodiments of this specification.

FIG. 4 is a schematic structural diagram illustrating an electronic device, according to one or more embodiments of this specification. Referring to FIG. 4, at a hardware level, the electronic device includes a processor, and optionally, further includes an internal bus, a network interface, and a storage. The storage may include a memory, for example, a random access memory (RAM), and may further include a non-volatile memory, for example, at least one disk memory. Certainly, the electronic device may further include hardware needed by another service.

The processor, the network interface, and the storage can be connected to each other through an internal bus. The internal bus can be an industry standard architecture (ISA) bus, a peripheral component interconnect (PCI) bus, an extended industry standard architecture (EISA) bus, etc. The buses can be classified into an address bus, a data bus, a control bus, etc. For ease of representation, in FIG. 4, only one bidirectional arrow is used to represent the bus, but it does not indicate that there is only one bus or only one type of bus.

The storage is configured to store a program. Specifically, the program can include program code, and the program code includes computer operation instructions. The storage can include a memory and a non-volatile memory, and provide instructions and data for the processor.

The processor reads a corresponding computer program from the non-volatile memory, and runs the computer program in the memory, to implement, at a logical level, an apparatus for evicting a memory block in a cache. The eviction apparatus can be a storage system, or can be a component of the storage system. The processor executes the program stored in the storage, and is specifically configured to perform the following operations: determining a temperature index value of the memory block in the cache, where the memory block is a storage unit of the cache; determining, based on the temperature index value of the memory block in the cache, a to-be-evicted memory block that needs to be cleared in the cache; migrating a target element in the to-be-evicted memory block to a target memory block in the cache, where the target memory block is a memory block that is retained in the cache and whose available storage space is greater than storage space needed by the target element; and deleting the to-be-evicted memory block from the cache.

The electronic device in the one or more embodiments of this specification can update the temperature index value of the memory block in the cache, and when cache space needs to be cleared, determine, based on the updated temperature index value of the memory block, a to-be-evicted memory block that needs to be cleared. Before clearing, a valuable element in the to-be-evicted memory block is migrated to another memory block, to avoid a case in which a high-value element in the cache is lost due to clearing of the memory block, and consequently, performance and gain are reduced.

The eviction method disclosed in the embodiment shown in FIG. 1 in this specification can be applied to the processor, or implemented by the processor. The processor may be an integrated circuit chip, and has a signal processing capability. In an implementation process, the steps of the method can be completed by using an integrated logic circuit of hardware of the processor or instructions in the form of software. The processor can be a general-purpose processor, including a central processing unit (CPU), a network processor (NP), etc., or can be a digital signal processor (DSP), an application-specific integrated circuit (ASIC), a field-programmable gate array (FPGA) or another programmable logic device, a discrete gate or transistor logic device, or a discrete hardware component. The methods, steps, and logical block diagrams disclosed in the embodiments of this specification can be implemented or executed. The general-purpose processor can be a microprocessor, or the processor can be any conventional processor, etc. The steps of the method disclosed with reference to the embodiments of the specification can be directly completed by a hardware decoding processor, or can be completed by a combination of hardware and software modules in the decoding processor. The software module can be located in a mature storage medium in the art, for example, a random access memory, a flash memory, a read-only memory, a programmable read-only memory, an electrically erasable programmable memory, or a register. The storage medium is located in the storage, and the processor reads information in the storage and completes steps of the method in combination with hardware of the processor.

It should be understood that, the electronic device in the embodiments of this specification can implement functions of the consensus method in the embodiments shown in FIG. 1 and FIG. 2. Because principles are the same, details are omitted in this specification.

Certainly, in addition to software implementations, the electronic device in this specification does not preclude other implementations, for example, a logic device or a combination of software and hardware. In other words, an execution body of the following processing procedure is not limited to each logical unit, and can be hardware or a logic device.

In addition, one or more embodiments of this specification further provide a computer-readable storage medium. The computer-readable storage medium stores one or more programs. The one or more programs include instructions. When the instructions are executed by a portable electronic device including a plurality of applications, the portable electronic device can perform the method in the embodiment shown in FIG. 1, and is specifically configured to perform the following steps: determining a temperature index value of a memory block in a cache, where the memory block is a storage unit of the cache; determining, based on the temperature index value of the memory block in the cache, a to-be-evicted memory block that needs to be cleared in the cache; migrating a target element in the to-be-evicted memory block to a target memory block in the cache, where the target memory block is a memory block that is retained in the cache and whose available storage space is greater than storage space needed by the target element; and deleting the to-be-evicted memory block from the cache.

A person skilled in the art should understand that the embodiments of this specification can be provided as a method, a system, or a computer program product. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

Some specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification. In addition, all other embodiments obtained by a person of ordinary skill in the art based on one or more embodiments of this specification without creative efforts shall fall within the protection scope of this specification.

What is claimed is:

1. A computer-implemented method for cache memory block eviction, comprising:
   determining a temperature index value of a memory block in a cache, wherein the memory block is a storage unit of the cache;
   determining, based on the temperature index value of the memory block in the cache, a to-be-evicted memory block that needs to be cleared in the cache;
   migrating a target element in the to-be-evicted memory block to a target memory block in the cache, wherein the target memory block is a memory block that is retained in the cache and whose available storage space is greater than storage space required by the target element; and
   deleting the to-be-evicted memory block from the cache.

2. The computer-implemented method of claim 1, wherein:
   the target element is all elements in the to-be-evicted memory block, or the target element is an element whose temperature index value reaches an element temperature threshold in the to-be-evicted memory block.

3. The computer-implemented method of claim 2, wherein:
   if a memory block that can store all elements in the to-be-evicted memory block is retained in the cache, the target element is all elements in the to-be-evicted memory block.

4. The computer-implemented method of claim 2, wherein:
   if no memory block that can store all elements in the to-be-evicted memory block is retained in the cache, the target element is an element whose temperature index value reaches the element temperature threshold in the to-be-evicted memory block.

5. The computer-implemented method of claim 1, wherein:
   before migrating a target element in the to-be-evicted memory block to a target memory block in the cache:
   selecting, from the cache as the target memory block, another memory block that is retained and that can store the target element.

6. The computer-implemented method of claim 5, wherein:
   if no other memory block that can store the target element is retained in the cache, selecting, from the cache as the target memory block, another memory block that is retained and that can store the target element, comprises:
   deleting, as a deleted element, an element in another memory block retained in the cache, to clear storage space used to store the target element; and
   determining, as the target memory block, the another memory block whose storage space is cleared, wherein a temperature index value of the deleted element in the another memory block is less than a temperature index value of the target element.

7. The computer-implemented method of claim 1, wherein:
   an execution condition of determining, based on the temperature index value of the memory block in the cache, a to-be evicted memory block that needs to be cleared in the cache, comprises:
   occupation of storage space of the cache reaches an occupation upper limit;
   a quantity of memory blocks in the cache reaches a quantity upper limit; and
   a memory block that is not accessed for predetermined time exists in the cache.

8. The computer-implemented method of claim 1, wherein:
   a temperature index value of an element in the memory block is calculated based on a quantity of access times corresponding to the element.

9. The computer-implemented method of claim 8, wherein:
   the temperature index value of the element in the memory block is alternatively calculated based on a previous-period temperature index value, a temperature temporal attenuation coefficient, and/or an element weight coefficient that correspond/corresponds to the element.

10. The computer-implemented method of claim 8, wherein:
    the temperature index value of the memory block is determined based on temperature index values of all elements in the memory block.

11. The computer-implemented method of claim 1, wherein:
   determining, based on the temperature index value of the memory block in the cache, a to-be-evicted memory block that needs to be cleared in the cache, comprises:
      selecting, in ascending order of temperature index values, a predetermined quantity of memory blocks as the target memory block that needs to be cleared; or
      determining that a memory block whose temperature index value does not reach a memory block temperature threshold in the cache is the target memory block that needs to be cleared.

12. A non-transitory, computer-readable medium storing one or more instructions executable by a computer system to perform one or more operations for cache memory block eviction, comprising:
   determining a temperature index value of a memory block in a cache, wherein the memory block is a storage unit of the cache;
   determining, based on the temperature index value of the memory block in the cache, a to-be-evicted memory block that needs to be cleared in the cache;
   migrating a target element in the to-be-evicted memory block to a target memory block in the cache, wherein the target memory block is a memory block that is retained in the cache and whose available storage space is greater than storage space required by the target element; and
   deleting the to-be-evicted memory block from the cache.

13. The non-transitory, computer-readable medium of claim 12, wherein:
   the target element is all elements in the to-be-evicted memory block, or the target element is an element whose temperature index value reaches an element temperature threshold in the to-be-evicted memory block.

14. The non-transitory, computer-readable medium of claim 13, wherein:
   if a memory block that can store all elements in the to-be-evicted memory block is retained in the cache, the target element is all elements in the to-be-evicted memory block.

15. The non-transitory, computer-readable medium of claim 13, wherein:
   if no memory block that can store all elements in the to-be-evicted memory block is retained in the cache, the target element is an element whose temperature index value reaches the element temperature threshold in the to-be-evicted memory block.

16. The non-transitory, computer-readable medium of claim 12, wherein:
   before migrating a target element in the to-be-evicted memory block to a target memory block in the cache:
      selecting, from the cache as the target memory block, another memory block that is retained and that can store the target element.

17. The non-transitory, computer-readable medium of claim 16, wherein:
   if no other memory block that can store the target element is retained in the cache, selecting, from the cache as the target memory block, another memory block that is retained and that can store the target element, comprises:
      deleting, as a deleted element, an element in another memory block retained in the cache, to clear storage space used to store the target element; and
      determining, as the target memory block, the another memory block whose storage space is cleared, wherein a temperature index value of the deleted element in the another memory block is less than a temperature index value of the target element.

18. The non-transitory, computer-readable medium of claim 12, wherein:
   an execution condition of determining, based on the temperature index value of the memory block in the cache, a to-be evicted memory block that needs to be cleared in the cache, comprises:
      occupation of storage space of the cache reaches an occupation upper limit;
      a quantity of memory blocks in the cache reaches a quantity upper limit; and
      a memory block that is not accessed for predetermined time exists in the cache.

19. The non-transitory, computer-readable medium of claim 12, wherein:
   a temperature index value of an element in the memory block is calculated based on a quantity of access times corresponding to the element.

20. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations for cache memory block eviction, comprising:
      determining a temperature index value of a memory block in a cache, wherein the memory block is a storage unit of the cache;
      determining, based on the temperature index value of the memory block in the cache, a to-be-evicted memory block that needs to be cleared in the cache;
      migrating a target element in the to-be-evicted memory block to a target memory block in the cache, wherein the target memory block is a memory block that is retained in the cache and whose available storage space is greater than storage space required by the target element; and
      deleting the to-be-evicted memory block from the cache.

* * * * *